Figures 1, 2, 3:
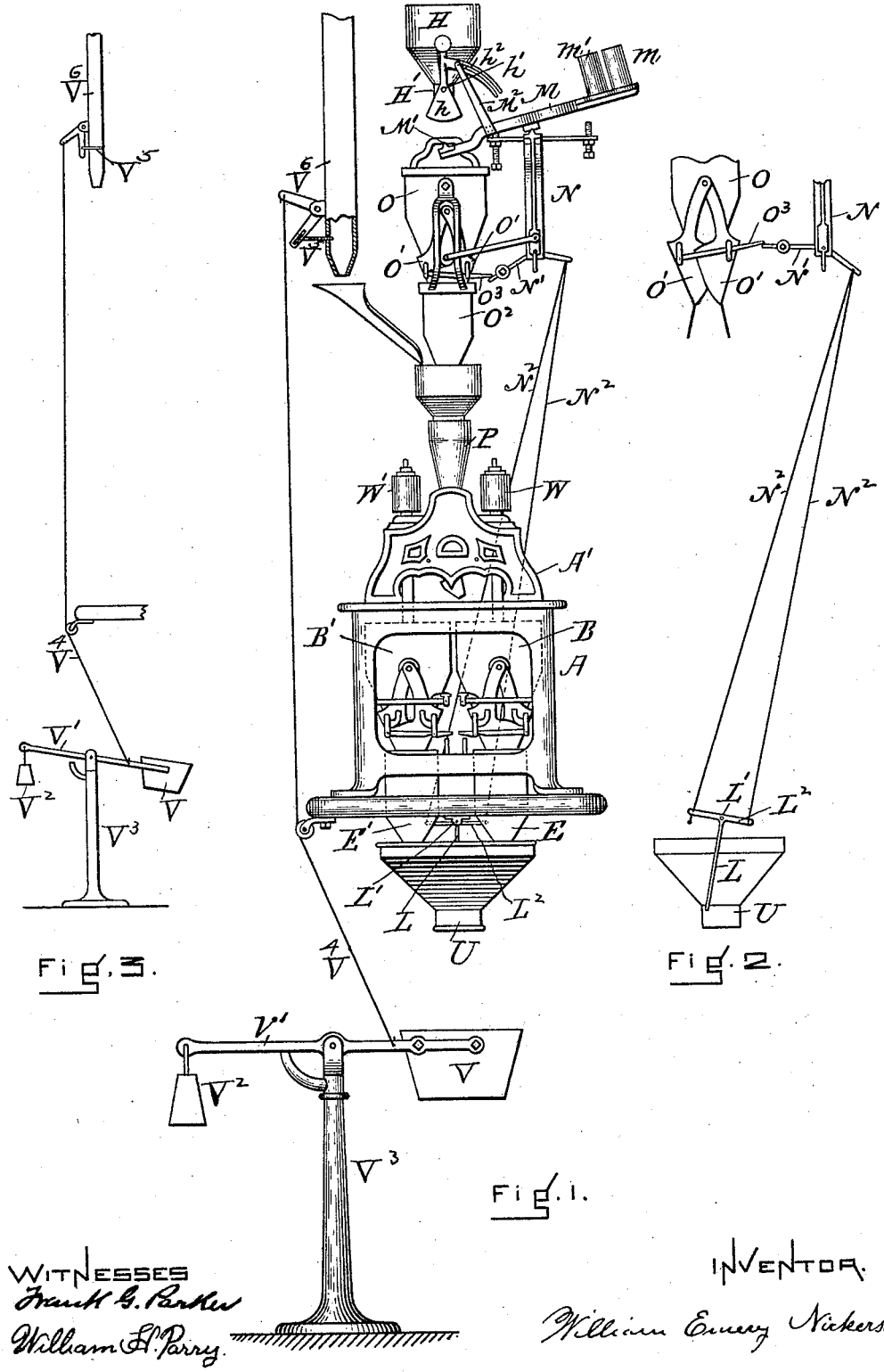

(No Model.) 8 Sheets—Sheet 1.

W. E. NICKERSON.
AUTOMATIC WEIGHING APPARATUS.

No. 574,445. Patented Jan. 5, 1897.

WITNESSES
Frank G. Parker
William H. Parry

INVENTOR
William Emery Nickerson (No Model.)   W. E. NICKERSON.   8 Sheets—Sheet 2.
AUTOMATIC WEIGHING APPARATUS.
No. 574,445.   Patented Jan. 5, 1897.

WITNESSES

INVENTOR (No Model.)  8 Sheets—Sheet 3.

W. E. NICKERSON.
AUTOMATIC WEIGHING APPARATUS.

No. 574,445.  Patented Jan. 5, 1897.

Witnesses.
Frank G. Parker
William H. Parry.

Inventor
William Emery Nickerson (No Model.) 8 Sheets—Sheet 4.

W. E. NICKERSON.
AUTOMATIC WEIGHING APPARATUS.

No. 574,445. Patented Jan. 5, 1897.

WITNESSES.
Frank G. Parker
William H. Parry

INVENTOR.
William Emery Nickerson (No Model.) 8 Sheets—Sheet 5.

W. E. NICKERSON.
AUTOMATIC WEIGHING APPARATUS.

No. 574,445. Patented Jan. 5, 1897.

WITNESSES.
Frank G. Parker
William H. Parry.

INVENTOR
William Emery Nickerson (No Model.) 8 Sheets—Sheet 6.

W. E. NICKERSON.
AUTOMATIC WEIGHING APPARATUS.

No. 574,445. Patented Jan. 5, 1897.

Witnesses.
Frank G. Parker
William H. Parry.

Inventor
William Emery Nickerson (No Model.) 8 Sheets—Sheet 7.

W. E. NICKERSON.
AUTOMATIC WEIGHING APPARATUS.

No. 574,445. Patented Jan. 5, 1897.

WITNESSES
Frank G. Parker
William H. Parry

INVENTOR
William Emery Nickerson (No Model.) 8 Sheets—Sheet 8.

W. E. NICKERSON.
AUTOMATIC WEIGHING APPARATUS.

No. 574,445. Patented Jan. 5, 1897.

WITNESSES
Frank G. Parker
William H. Parry

INVENTOR
William Emery Nickerson

UNITED STATES PATENT OFFICE.

WILLIAM EMERY NICKERSON, OF CAMBRIDGE, MASSACHUSETTS, ASSIGNOR TO THE NEW ENGLAND WEIGHING MACHINE COMPANY, OF BOSTON, MASSACHUSETTS.

AUTOMATIC WEIGHING APPARATUS.

SPECIFICATION forming part of Letters Patent No. 574,445, dated January 5, 1897.

Application filed June 22, 1896. Serial No. 596,488. (No model.)

*To all whom it may concern:*

Be it known that I, WILLIAM EMERY NICKERSON, of Cambridge, in the county of Middlesex and State of Massachusetts, have invented a new and useful Improvement in Automatic Weighing Apparatus, of which the following, taken in connection with the accompanying drawings, is a specification.

The object of my invention is to produce a complete apparatus adapted to weigh automatically and accurately granular or other material, either for the purpose of registering the amount which passes through or for dividing it into lots of a precisely uniform weight.

My apparatus consists principally of two separate scales, through whose automatic coöperation rapidity, accuracy, and regularity of weighing are secured. One of these scales, which I call the "primary," is adapted to receive a comparatively large stream of material from a suitable conveying-pipe, and when a predetermined amount, by weight, has run into it to shut off the stream and retain the weighed charge until its delivery is brought about by an action of its companion scale, after which the primary scale refills and holds its load as before. The charge delivered by the primary scale is weighed with only moderate accuracy on account of the supply-stream being large. It is always somewhat less than the full amount desired to be put into the lot or package and passes from the primary into its companion scale, which I call the "secondary."

The secondary scale is constructed with a view to greater sensitiveness than the primary, and besides receiving the material delivered by the latter, whose action it induces by a suitable mechanism, has an independent source of supply consisting of a small stream of the material which is fed directly into it and serves to increase the charge delivered by the primary scale to the full and accurate amount required. In other words, the primary scale by operating in connection with a large stream can rapidly deliver an approximately-weighed amount somewhat less than the full weight to the sensitive secondary scale, in which the full and exact weight is quickly made up by the small stream.

By the coöperation of my primary and secondary scales far more satisfactory results are obtained than by dumping a quantity of material measured by bulk into an automatic scale and making up the full load by a small stream. Most granular substances, for the weighing of which automatic scales are commercially used, vary so much in specific gravity in different samples and even in different measures full that the margin left for the small stream to make up is very inconstant, and the rate of weighing therefore very irregular, frequent adjustments being required. By the use, however, of my combination great accuracy, rapidity, and regularity are readily obtained.

My invention is illustrated in the accompanying drawings, in which—

Figure 4:
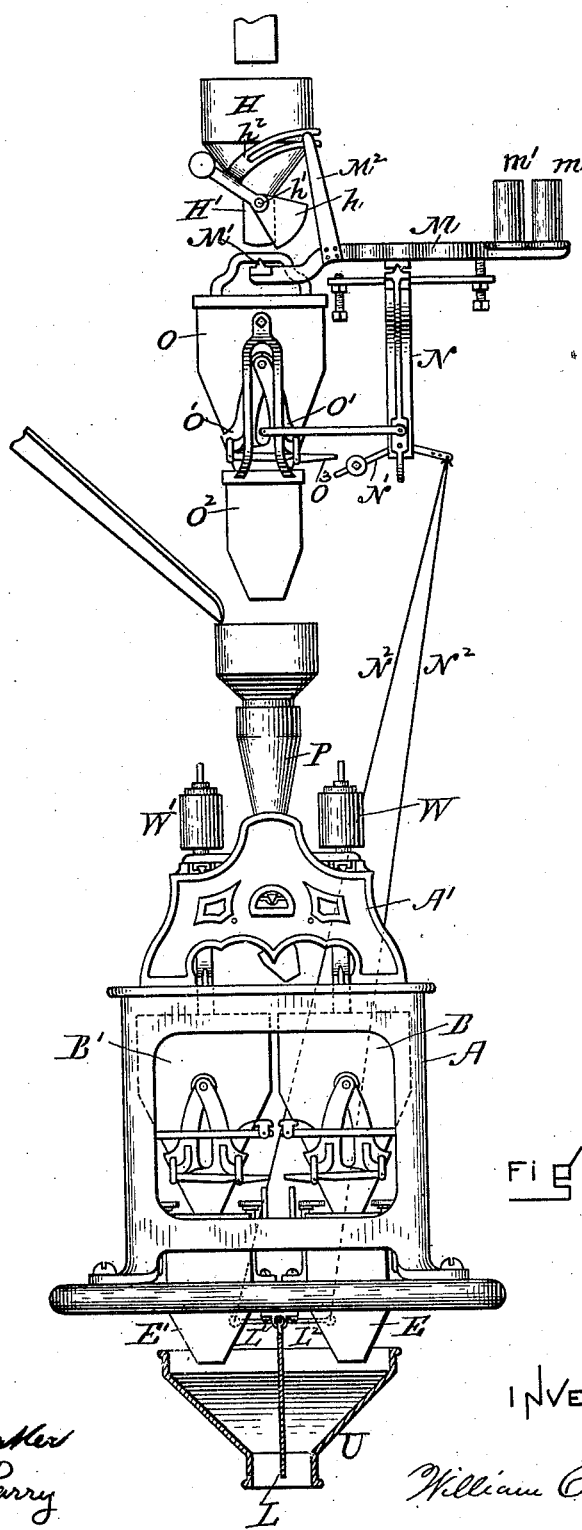
Figure 5:
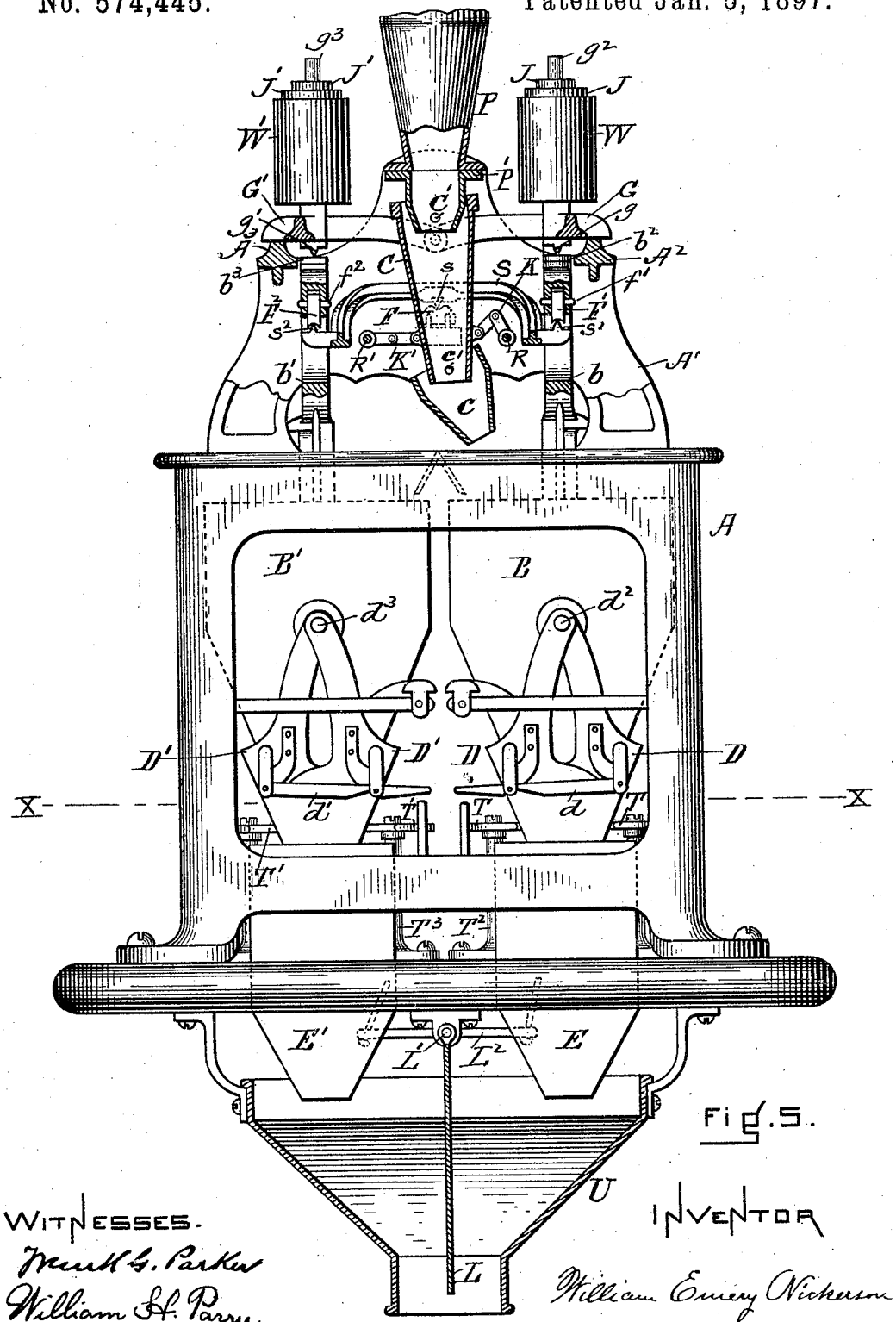
Figure 6:
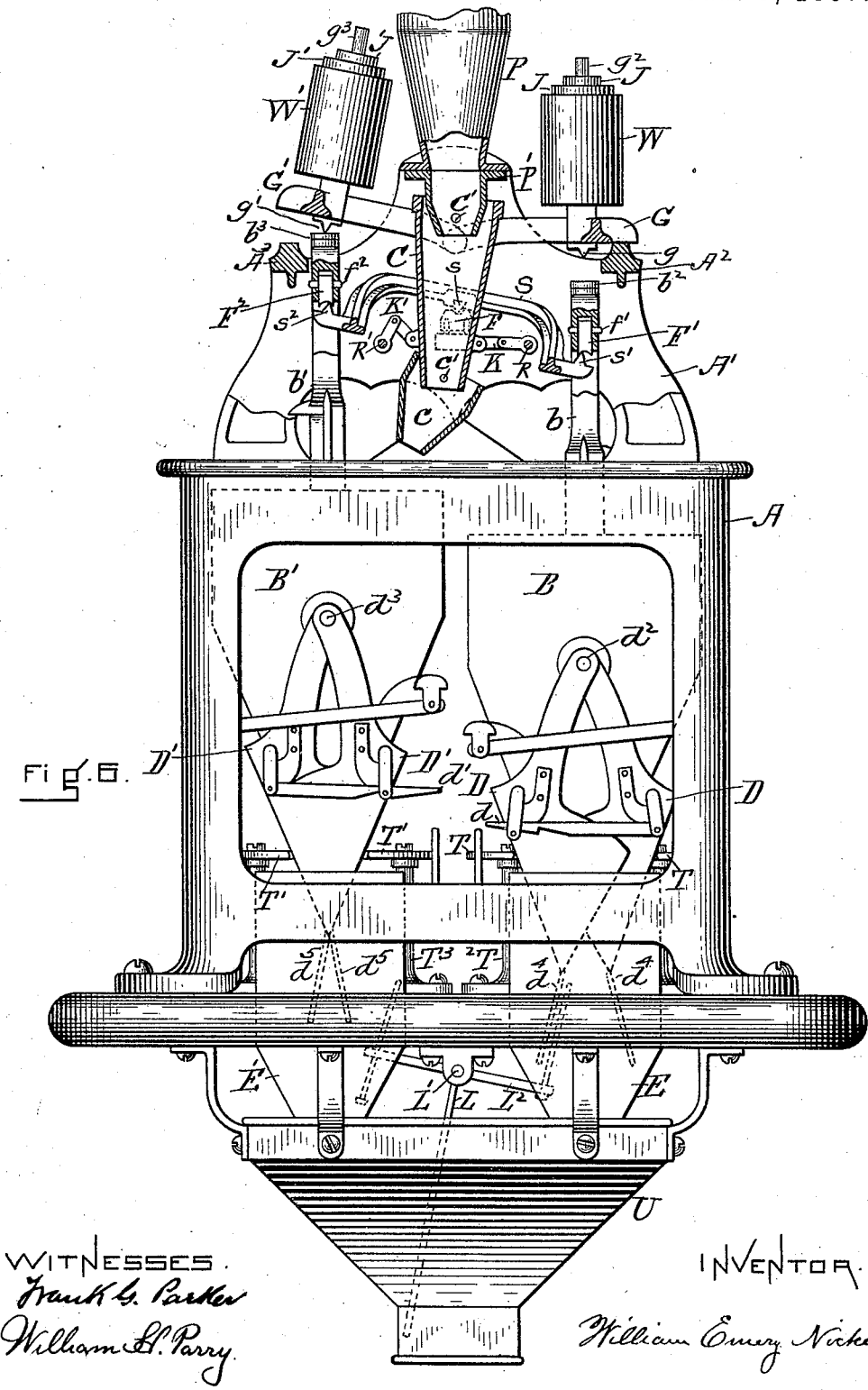
Figure 7:
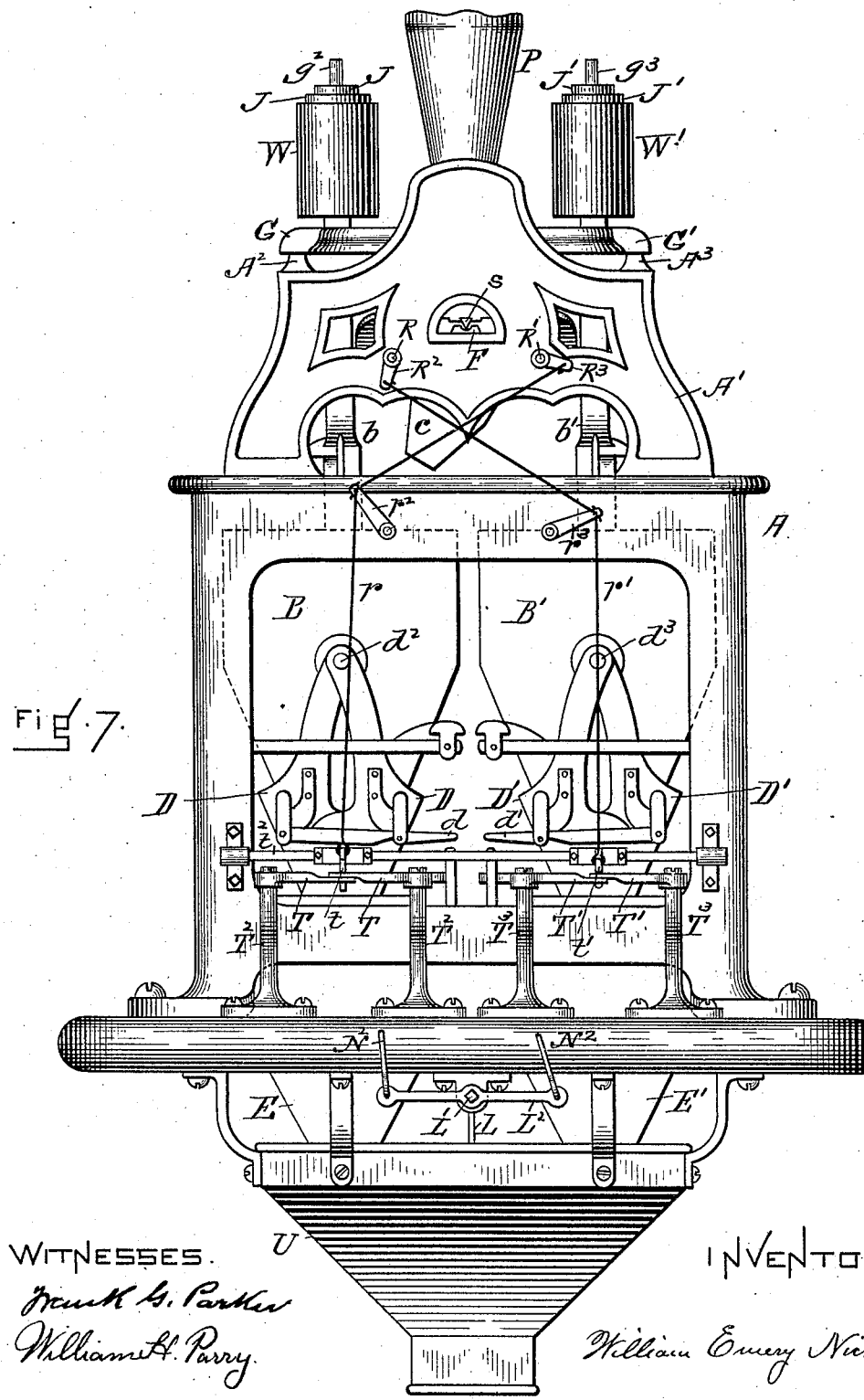
Figure 6:
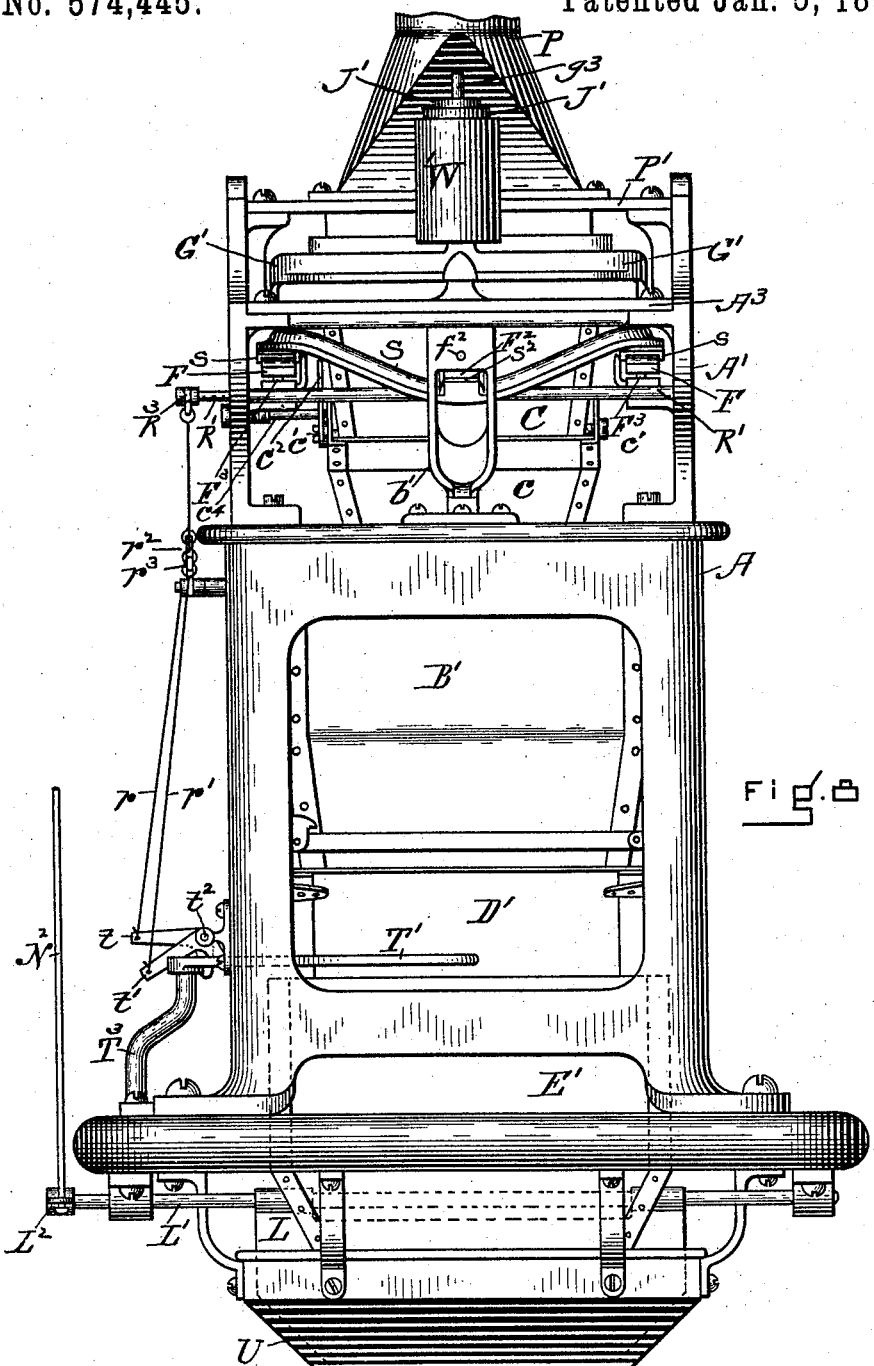
Figure 9:
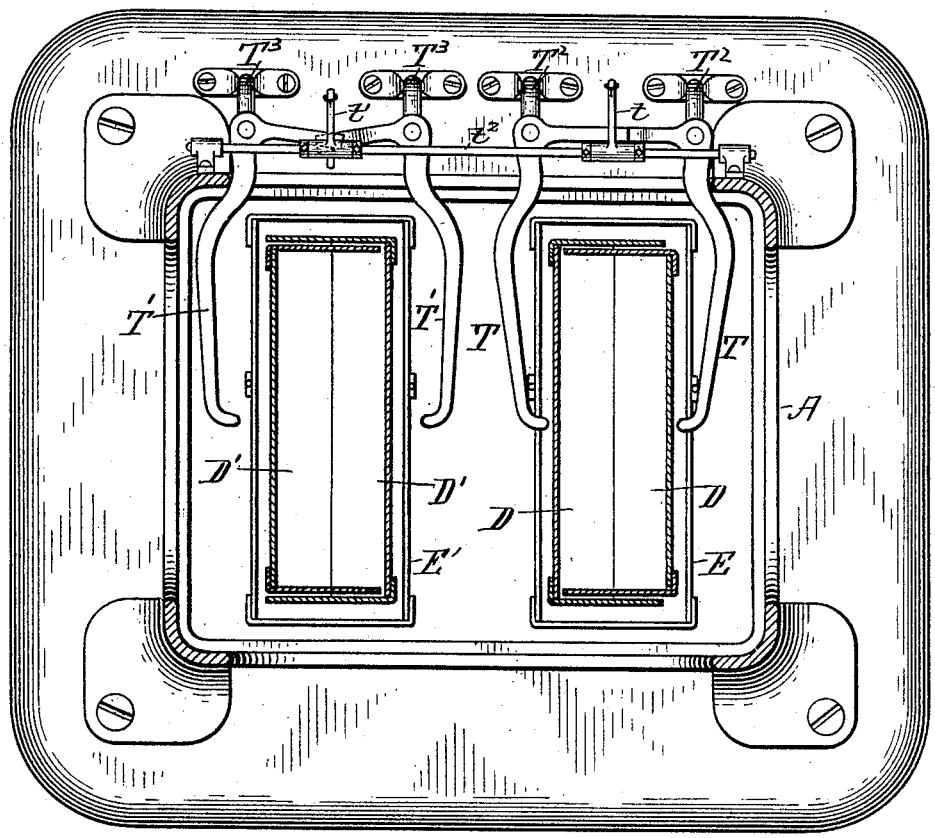
Figure 10:
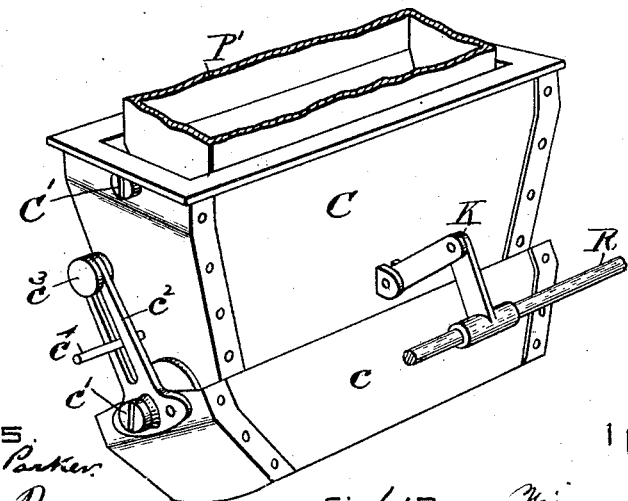
Figure 11:
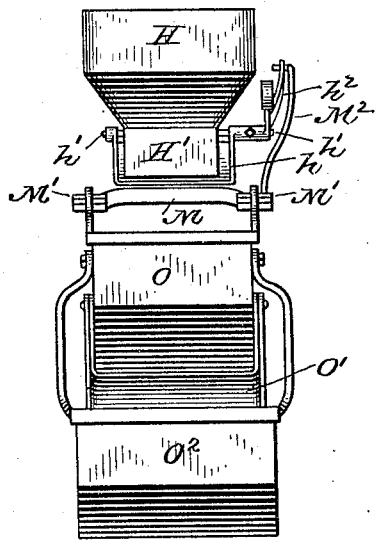
Figure 12:
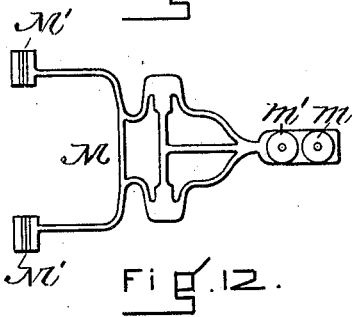
Figure 13:
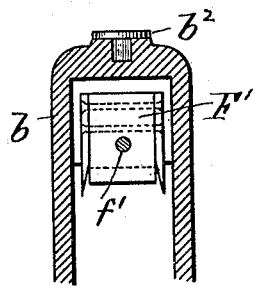
Figure 14:
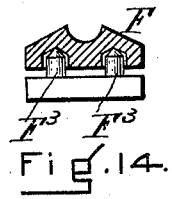

Figure 1 shows my complete apparatus in front elevation. Fig. 2 shows certain parts in a different position. Fig. 3 also shows parts in a different position. Fig. 4 is a view, partly in front elevation and partly in vertical section, but showing certain parts in a position different from that shown in Fig. 1. Fig. 5 is a view partly in front elevation and partly in vertical section of the secondary scale in in the position which it occupies just before the discharge of a weighing-bucket. Fig. 6 is a view of the secondary scale, partly in front elevation and partly in vertical section, showing one of the weighing-buckets in the act of discharging its load. Fig. 7 is a rear elevation of the secondary scale, especially showing the mechanism for shifting the swinging chute. Fig. 8 is a side elevation of the secondary scale. Fig. 9 is a horizontal section taken on the line $x\,x$ of Fig. 5, and especially shows a part of the chute-shifting mechanism. Fig. 10 is a perspective view of the swinging chute and tip. Fig. 11 is a side elevation of the primary scale and connected parts. Fig. 12 is a plan of the weighted beam of the primary scale detached from connected parts. Fig. 13 is an enlarged view of the end knife-blocks. Fig. 14 is an enlarged view of the central knife-blocks.

I will first describe the secondary or accurately-weighing scale, in which A represents the principal framework, and A' the top frame, upon which the scale-beam, chute, weight-arms and weights, and immediately-connected parts are supported. B and B' are the weighing-buckets, which depend from either end of the ring-shaped scale-beam S by means of the standards $b$ and $b'$. The buckets B and B' are provided with the discharge-doors D D and D' D', which are held in their closed position by the latches $d$ $d$ and $d'$ $d'$, the pressure of the charge within causing them to open whenever the latches are disengaged, thus allowing the charges to fall into the door-boxes E and E', located beneath the doors and into which the doors project somewhat. The doors D D and D' D' are so hung upon their pivots $d^2$ $d^2$ and $d^3$ $d^3$ as to close by their gravity when not impeded, and are provided upon their lower edges with the wing-pieces $d^4$ $d^4$ and $d^5$ $d^5$, which extend downward into the boxes E and E', Fig. 6, and coöperate with the latter in preventing the retention of any part of the escaping load by premature closing. This action of the wing-pieces is produced by the pressure of the load against them, pressing them outward, since it is somewhat checked in passing through the box, holding them in this position and the doors open until all the load has fallen below the lower edges of the doors themselves.

The scale-beam S oscillates centrally by means of the knife-edges $s$ $s$ upon the balanced knife-blocks F F, one at front and one at the back of the scale, which are mounted upon the pins $F^3$ $F^3$, Fig. 14, arranged at right angles to the line of their knife-edges, whereby they are free to aline themselves with the latter. The scale-beam carries at its outer ends the knife-edges $s'$ and $s^2$, upon which bear the knife-blocks $F'$ $F^2$, located in the standards $b$ and $b'$, respectively. These knife-blocks are pivoted in the standards upon the pins $f'$ and $f^2$, which extend at right angles to the line of their respective knife-edges, thereby allowing the said knife-blocks to perfectly conform to their knife-edges. The knife-blocks F F are shown in enlarged section in Fig. 14, and the blocks $F'$ and $F^2$ are illustrated by Fig. 13.

The tops of the standards $b$ and $b'$ are provided with the steel caps $b^2$ and $b^3$, which serve as contact-surfaces for the knife-edges $g$ and $g'$, fixed in the pivoted weight-arms G and G', respectively. These weight-arms, which are fully described in my Patent No. 555,393, are provided with the upright rods $g^2$ and $g^3$, which serve as supports for the main weighing-weights W and W' and the adjusting-weights J J and J' J', respectively. The downward movement of the weight-arms G and G' is limited by the cross-bars $A^2$ and $A^3$, extending from front to back upon the top frame A'. The weight-arms rest upon these cross-beams when not raised by the standards $b$ and $b'$, and each weight-arm opposes the charge in the weighing-bucket on the opposite side of the machine.

At the upper part of the top frame A' and extending from front to back is a perforated cross-beam P', supporting upon its upper side the delivering-pipe P and carrying upon its under side the chute C, which is pivoted to it, as shown at C'. At the lower end of the chute C and pivoted to it, as shown at $c'$, is the chute-tip $c$, provided with the arm $c^2$, preferably carrying the weight $c^3$. The arm $c^2$ engages with a fixed pin $c^4$, projecting inwardly from the top frame A' at a level somewhat above the pivot of the chute-tip $c$, whereby a comparatively slight oscillation of the chute C causes a greater incline in the chute-tip. In Fig. 10 the chute and tip are shown in perspective detached from the scale.

From front to back through the top frame A', one on either side of the chute C, pass two rocker-shafts R and R', Figs. 5 and 8. These shafts are provided with the knuckle-joints K and K', respectively, connected with the chute C, as shown, so that by a partial rotation of the rocker-shaft whose knuckle-joint is straight, the other one being bent, the chute is pulled over, the joint which was straight becoming bent, while the bent joint straightens and locks the chute in its new position. The rocker-shafts are provided at their rear ends with the arms $R^2$ and $R^3$, Fig. 7, to which are attached the pull-wires $r$ and $r'$, which are preferably deflected into alinement by the guiding-arms $r^2$ and $r^3$ and are connected at their lower ends with the bent arms $t$ and $t'$, Figs. 7 and 8. These arms $t$ and $t'$ are loosely mounted upon the horizontal shaft $t^2$, which is supported upon the back of the main frame, as shown. The lower ends of the arms $t$ and $t'$ engage as required with the ends of the bent arms T T, Figs. 5, 7, 8, and 10, and T' T', which are mounted upon the standards $T^2$ $T^2$ and $T^3$ $T^3$. The inner ends of the arms T T and T' T' extend horizontally along the sides of the doors D D and D' D', Fig. 9, but not in contact with them when the latter are closed. The doors upon opening in their turn come in contact with the inner ends of the arms T T and T' T', respectively, throwing them outward and causing their opposite ends to engage with the bent arms $t$ or $t'$, as the case may be, and operating through them the pull-wires $r$ and $r'$, and the rocker-shafts R and R' throw the chute from one side to the other as required.

Located above the secondary scale is the primary scale, Figs. 1, 2, 4, and 11, having a weighing-beam M, mounted upon the supporting-frame N. The beam M (shown detached in plan in Fig. 12) carries upon its outer end the weights $m$ and $m'$ and supports by the knife-edges M' M' upon its inner and bifurcated end the weighing-bucket O. The bucket O is provided with the discharge-doors O' O' and a door-box $O^2$, essentially like those in the secondary scale. Over the weighing-bucket O is mounted a supply-hopper H, having a downwardly-projecting delivering-pipe H', upon which is mounted the swinging shut-off piece $h$, preferably counterbalanced, which is pivoted to the pipe H' at $h'$. This shut-off piece is opened and closed by the action of the slotted arm $h^2$, attached to it, and the arm $M^2$, which is fixed to the weighing-beam M, whereby a downward movement of the inner or bucket-supporting end of the weighing-beam closes the shut-off piece and the return or upward movement opens it again. Upon the supporting-frame N is pivoted the balanced arm N', whose inner end is adapted upon an upward movement to release the latches $O^3$ $O^3$ of the doors O' O' of the bucket O. The outer end of the arm N' is connected with the shaft L' of the secondary scale by means of the wires $N^2$ $N^2$ and centrally-mounted arm $L^2$, so that a rotation of the said shaft L' in either direction will cause the releasing of the latches $O^3$ $O^3$ and consequent opening of the doors O' O' of the bucket O. A limited rotary movement is given to the shaft L', when required, by means of the centrally-dependent flap L, which is attached to it and extends downward into the discharge-hopper U, as shown. Upon a discharge of a load from either bucket of the secondary scale the falling material presses the dependent flap L over to the opposite side, and operating through the shaft L' and one or the other of the pull-wires $N^2 N^2$ and arm N' causes the tripping of the latches $O^3$ $O^3$ and a fresh discharge from the bucket O of the primary scale.

Located at some distance below the discharge-hopper U of the secondary scale is the balanced arm V', carrying the catch-bucket V, and upon its opposite end the weight $V^2$, all being supported upon the standard $V^3$, Fig. 1. The balanced arm V' is connected by means of a pull-wire $V^4$ or other suitable mechanism with a shut-off device $V^5$, located in the feed-pipe $V^6$, as shown, said pipe being adapted to deliver a small stream to the secondary scale, so that if material discharged from said scale is not properly received in receptacles it will, by falling into the catch-bucket V, overbalance the weight $V^2$ and by tilting the arm V' operate through the wire $V^4$ and shut-off device $V^5$ to interrupt the supply of material and prevent further discharges, Fig. 3.

Starting with the bucket O of the primary scale containing a load and in the position shown in Fig. 1, the shut-off piece $h$ blocking the flow of material from the pipe H' and with the small stream from the pipe $V^6$ running into the weighing-bucket B of the secondary scale, the said bucket containing nearly a full charge, the operation will be as follows: When the full amount has accumulated in the weighing-bucket B, it will raise its relative weight W' and descend, Fig. 6, disengaging the door-latches $d$ $d$ at the latter part of its downward movement. The charge within it will then force open the doors D D with considerable power, Fig. 6, and the latter will, by engaging with them, force the arms T T apart. The inward movement of their opposite ends operating through the bent lever $t$ and pull-wire $r$ will cause a partial rotation of the arm $R^3$ and rocker-shaft R', thereby doubling up the knuckle-joint K', Fig. 6, and swing the chute C and chute-tip $c$ over the other weighing-bucket B', when it will be held by the knuckle-joint K which has straightened. Upon the opening of the doors D D the charge of material falls into the door-box E, where it acts upon the door-wings $d^4$ $d^4$ and holds the doors open until all the material has passed below them into the door-box, and upon passing out of the latter will allow the doors to close and latch. The material further descending into the discharge-hopper U will act upon the dependent flap L, forcing it over into the position shown in Fig. 6, and cause by its movement through the shaft L', arm $L^2$, pull-wire $N^2$, and balanced arm N' the releasement of the latches $O^3$ $O^3$ of the doors O' O' of the bucket O, Fig. 2, whereupon a fresh quantity of material, somewhat less in amount than a full charge for the secondary scale, descends from the primary scale into the weighing-bucket B'. The bucket O of the primary scale, now empty, rises by the action of the weights $m$ $m'$ and comes into the position shown in Fig. 4, the shut-off piece $h$ being opened by the action of the arm $M^2$ and arm $h^2$. The material now runs from the supply-bin H into the bucket O until the quantity is sufficient to overbalance the weights $m$ $m'$, upon which the bucket O again descends, raising the weights $m$ $m'$ and throwing the shut-off piece $h$ under the pipe H', thereby cutting off the flow of material from the supply-bin H. The primary scale is now ready to again discharge its load into the secondary scale upon the tripping of the door-latches $O^3$ $O^3$ as before. In the meantime the small stream from the supply-pipe $V^6$ is running into the weighing-bucket B' of the secondary scale, which, when the required quantity has accumulated, will descend and the foregoing operation will be repeated, but by the complementary parts.

If the receptacles into which the secondary scale discharges are not presented as required, the charge will fall into the catch-bucket V and, overbalancing the weight $V^2$, will cause the balance-beam V' to oscillate, and, acting through the pull-wire $V^4$, close the shut-off device $V^5$ and stop the small stream flowing through the pipe $V^6$ and bring the apparatus to rest. (See Fig. 3.)

I claim—

1. In an apparatus for automatic weighing, in combination, two separate scales, a primary and a secondary, arranged and coöperating as follows; first a primary scale adapted to receive a comparatively large stream of material and to cut off said stream after having weighed out therefrom with approximate accuracy a charge somewhat less than a full weight for said secondary scale; and said primary scale being adapted to retain said charge until an action of the said secondary scale causes its discharge and then to deliver it to said secondary scale; and said primary scale having a latch device for discharging it, suitably connected with said secondary scale; and said primary scale being adapted to automatically refill from the said large stream whenever it has been emptied; and second, a secondary scale, adapted to receive the charge from said primary scale, and to also receive a small stream of material to make up a full and accurate weight; and said secondary scale having a suitable mechanism connected with the latch mechanism of the said primary scale whereby the said primary scale is discharged into the secondary scale upon each discharge of the latter; means for delivering a small stream into the secondary scale; connecting mechanism between the primary and secondary scales and means for supplying material to said primary scale, substantially as and for the purpose set forth.

2. In an apparatus for automatic weighing, a scale having two alternating weighing-buckets provided with discharge-doors having latches, said doors being adapted to be forced open by the pressure of the charge in the bucket when their latches are released, a chute adapted to oscillate from one bucket to the other, connecting mechanism by which the opening of the doors of each bucket alternately actuates the chute toward the opposite bucket, and a suitably-arranged scale-beam, weights and connected parts, substantially as and for the purpose set forth.

3. In an apparatus for automatic weighing, a scale having two alternating weighing-buckets and a delivery-chute adapted to oscillate from one bucket to the other, the combination of the chute C, knuckle-joints K and K', rocker-shafts R and R', mechanism for causing a partial rotation of the said shafts alternately upon the descent of the weighing-bucket, and a suitably-arranged scale-beam, weights and connected parts, substantially as and for the purpose set forth.

4. In an apparatus for automatic weighing, a scale having two alternating weighing-buckets, a chute adapted to oscillate from one bucket to the other, and said weighing-buckets having doors provided with latches, and said doors being adapted to be forced open by the charge of material in the buckets when said latches are released; in combination with the pivoted arms T T and T' T', said arms being out of contact with said doors when the latter are in their closed position, mechanism connecting said arms with the delivery-chute, whereby the opening of the doors causes the chute to swing over the alternate bucket, and a suitably-arranged scale-beam, weights, and connected parts, substantially as and for the purpose set forth.

5. In an apparatus for automatic weighing, a scale having two alternating weighing-buckets and a delivery-chute adapted to oscillate from one bucket to the other, and said buckets having doors provided with latches and said doors being adapted, when said latches are released, to be forced open by the charge in the buckets; the combination of the chute C, the knuckle-joints K and K', rocker-shafts R and R', the pull-wires $r$ and $r'$, the bent arms T T and T' T', the arms $t$ and $t'$, and a suitably-arranged scale-beam, weights and connected parts, all operating together as described, substantially as and for the purpose set forth.

6. In an apparatus for automatic weighing, a scale having two alternating weighing-buckets, a suitably-arranged scale-beam and weights, and a delivering-chute adapted to oscillate from one bucket to the other, the combination of the chute C, the chute-tip $c$, the arm $c^3$, and the fixed pin $c^4$, substantially as and for the purpose set forth.

7. In an apparatus for automatic weighing, in combination, a primary scale having latches for discharging it; with a secondary scale having the hopper U and centrally-hung flap L, said flap being adapted to be swung each way alternately by the discharge of the secondary scale as shown, and suitable mechanism connecting the said flap with said latches, substantially as and for the purpose set forth.

8. In an apparatus for automatic weighing, a primary scale embodying the following elements viz: a weighing-bucket having discharge-doors held closed by latches, and adapted to descend to the limit of its movement when loaded and to retain its charge until said latches are released, a weighted weighing-beam adapted to support said bucket, a feed-pipe having a shut-off mechanism adapted to close said pipe on a descent of said bucket, mechanism for connecting said shut-off with said beam whereby a descent of said bucket may close said shut-off and mechanism adapted to release said latches when required, substantially as and for the purpose set forth.

In testimony whereof I have signed my name to this specification, in the presence of two subscribing witnesses, on this 20th day of June, A. D. 1896.

WILLIAM EMERY NICKERSON.

Witnesses:
FRANK G. PARKER,
WILLIAM H. PARRY.